United States Patent [19]
Bliss

[11] Patent Number: 5,803,125
[45] Date of Patent: *Sep. 8, 1998

[54] ADJUSTABLE VALVE BOX

[75] Inventor: William Charles Bliss, Tyler, Tex.

[73] Assignee: Tyler Pipe Company, a division of Ransom Industries, Inc., Birmingham, Ala.

[ * ] Notice: The term of this patent shall not extend beyond the expiration date of Pat. No. 5,671,772.

[21] Appl. No.: 857,093

[22] Filed: May 15, 1997

Related U.S. Application Data

[63] Continuation-in-part of Ser. No. 747,266, Nov. 12, 1996, Pat. No. 5,671,772.

[51] Int. Cl.$^6$ .............................. F16L 5/00; E02D 29/14
[52] U.S. Cl. ......................................... 137/370; 137/371
[58] Field of Search ................................. 137/370, 369, 137/371

[56] References Cited

U.S. PATENT DOCUMENTS

| | | | |
|---|---|---|---|
| 304,116 | 8/1884 | Menne . | |
| 380,308 | 4/1888 | Barry, Jr. ................................. | 137/370 |
| 616,542 | 12/1898 | Koehne ................................... | 137/371 |
| 1,194,074 | 8/1916 | Roncaglione . | |
| 1,545,092 | 7/1925 | Ford . | |
| 2,244,939 | 6/1941 | Carlson ...................................... | 285/2 |
| 2,827,914 | 3/1958 | Alters ....................................... | 137/370 |
| 3,188,120 | 6/1965 | Peterson .................................. | 285/175 |
| 3,324,613 | 6/1967 | Duboff ..................................... | 52/122 |
| 3,504,383 | 4/1970 | Young ........................................ | 4/191 |
| 3,537,471 | 11/1970 | Houle ..................................... | 137/370 |
| 4,325,405 | 4/1982 | Christo .................................... | 137/370 |
| 5,312,141 | 5/1994 | Hannity ................................... | 285/302 |

*Primary Examiner*—A. Michael Chambers
*Attorney, Agent, or Firm*—Michael A. O'Neil

[57] ABSTRACT

A vertically adjustable valve box for providing access to underground valves includes a first member having a tubular section with a bell and a peripheral flange disposed at a distal end. A second member has a tubular section with a bell and a flange disposed at a distal end. A second peripheral flange is disposed on the exterior surface of the second member approximately six inches below the face of first flange. The tubular section of the second member is telescoped over the tubular section of the first member, wherein the respective bells and flanges are disposed on opposite ends of the assembly and the central longitudinal axis of each is vertical and substantially in alignment. An O-ring gasket is positioned circumferentially around the exterior of the tubular section of the first member and prevents the second member from telescoping downward on first member past a desired insertion position.

11 Claims, 3 Drawing Sheets

ADJUSTABLE VALVE BOX

RELATED APPLICATION

This application is a continuation-in-part of co-pending application Ser. No. 08/747,266 titled "Adjustable Valve Box" filed Nov. 12, 1996, now U.S. Pat. No. 5,671,772.

TECHNICAL FIELD

The present invention relates to valve boxes and, in particular, to a vertically adjustable valve box.

BACKGROUND OF THE INVENTION

Many pipes such as gas pipelines and water and sewer mains are typically laid and buried underground. Most underground lines require periodic underground isolation valves. Valves constructed with extended bonnets and stems are substantially more expensive than standard in-line valves. Therefore, a valve box allowing access is typically installed around the underground valve. Such a box usually includes an opening at the ground surface for providing access to the valve stem, in order to operate the underground valve.

Changes in surface terrain often dictate that the underground line will be positioned at different vertical distances from the surface grade level. Furthermore, the desired surface grade level may change over time. Custom constructed valve boxes are expensive and generally not adjustable for varying vertical dimensions. Alternatively, maintaining a stock of valve boxes with varying vertical dimensions is expensive. Therefore, a need exists for the vertically adjustable valve box of the present invention.

SUMMARY OF THE INVENTION

The present invention is a vertically adjustable valve box for use with underground valves. The valve box includes a first member having a tubular section with a bell and peripheral flange disposed at a distal end. The invention further includes a second member having a tubular section with a bell and first flange disposed at a distal end. The tubular section of the second member is telescoped over the tubular section of the first member, wherein the respective bells and flanges are disposed on opposite ends of the assembly and with the central longitudinal axis of each positioned vertically and substantially in alignment.

An O-ring gasket is positioned circumferentially around the exterior of the tubular section of the first member. The lower end of the tubular section of the second member contacts the O-ring gasket. The O-ring gasket is stretch-fit over the first member and prevents the second member from telescoping downward on the first member past a desired insertion position.

The bell of the first member is sized to receive a bonnet and a valve stem of an underground valve, positioned in an underground pipeline. The underside of the peripheral flange provides a bearing surface resisting penetration of the first member of the valve box into the surrounding soil and/or penetrating the valve and pipeline.

The bell of the second member includes a conical cavity narrowing in internal diameter from the peripheral flange to the tubular section. Disposed in the conical cavity is a circumferential ledge. The ledge receives a mating extended ring of a valve box cover, thereby supporting the valve box cover.

A second embodiment of the present invention includes a second peripheral flange disposed on the exterior surface of the second member approximately six inches below the first flange. The underside of the second peripheral flange provides additional bearing surface for resisting penetration of the second member into the surrounding soil and thereby provides additional stability to the valve box of the present invention.

BRIEF DESCRIPTION OF THE DRAWINGS

A more complete understanding of the adjustable valve box of the present invention may be had by reference to the following Detailed Description when taken in conjunction with the accompanying Drawings wherein.

DETAILED DESCRIPTION OF THE PREFERRED EMBODIMENT

Figure 1:
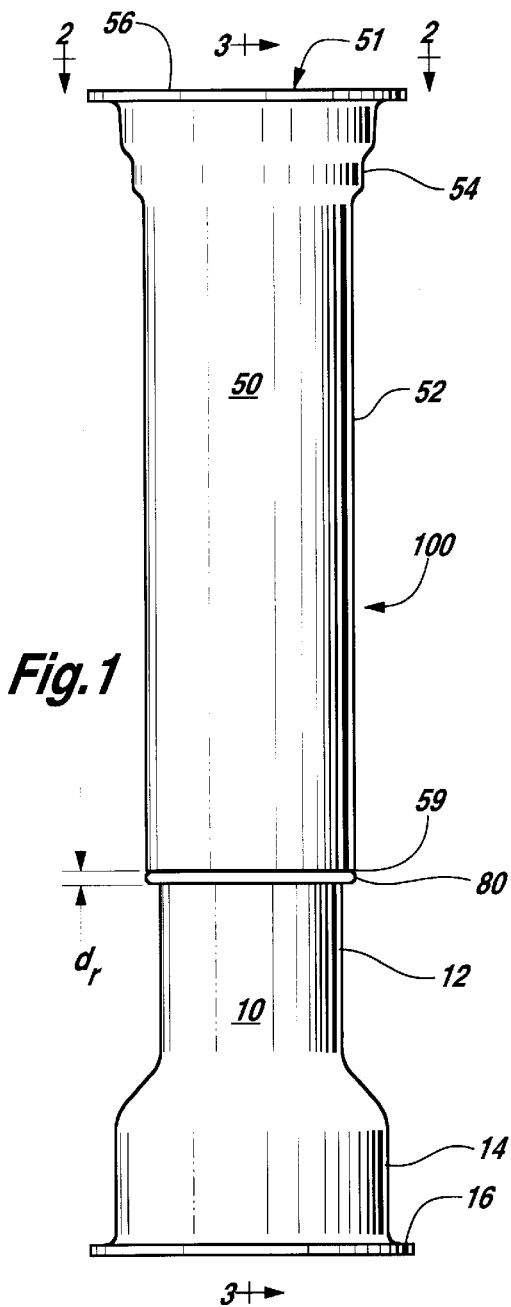
FIG. 1 is a side view of the adjustable valve box of the present invention.

Referring now to FIG. 1 therein is illustrated an adjustable valve box 100 manufactured from cast ductile iron having a first member 10 having a tubular section 12 with a bell 14 and a peripheral flange 16 disposed at a distal end. The central longitudinal axis of the first member is oriented vertically. The invention further includes a second member 50 with a tubular section 52 with a bell 54 and a flange 56 disposed at a distal end. The tubular section 52 of the second member 50 is telescoped over the tubular section 12 of the first member 10, wherein the respective bells 54 and 14 and flanges 56 and 16 are disposed on opposite ends of the valve box 100 and with the central longitudinal axis of each positioned vertically and substantially in alignment.

The valve box 100 further includes an O-ring gasket 80 positioned circumferentially around the exterior of the tubular section 12 of the first member 10. The lower end 59 of the tubular section 52 of the second member 50 contacts the O-ring gasket 80. In the preferred embodiment the O-ring gasket 80 is formed from Buna-N (Nitrile) and may be molded or extruded and spliced. The cross sectional diameter, $d_r$, of the O-ring 80 is typically 0.5 inch. The internal diameter of the opening in the O-ring is 5.5 inches and is stretch fit over a 5.75 inch external diameter of the tubular section 12. Sizing of the O-ring gasket is an important element of the present invention. The O-ring must have sufficient tensile strength to prevent the second member 50 from telescoping downward on the first member 10 past the desired insertion position. This important characteristic will be discussed in more detail in the subsequent discussion of assembly of the present invention.

Figure 3:
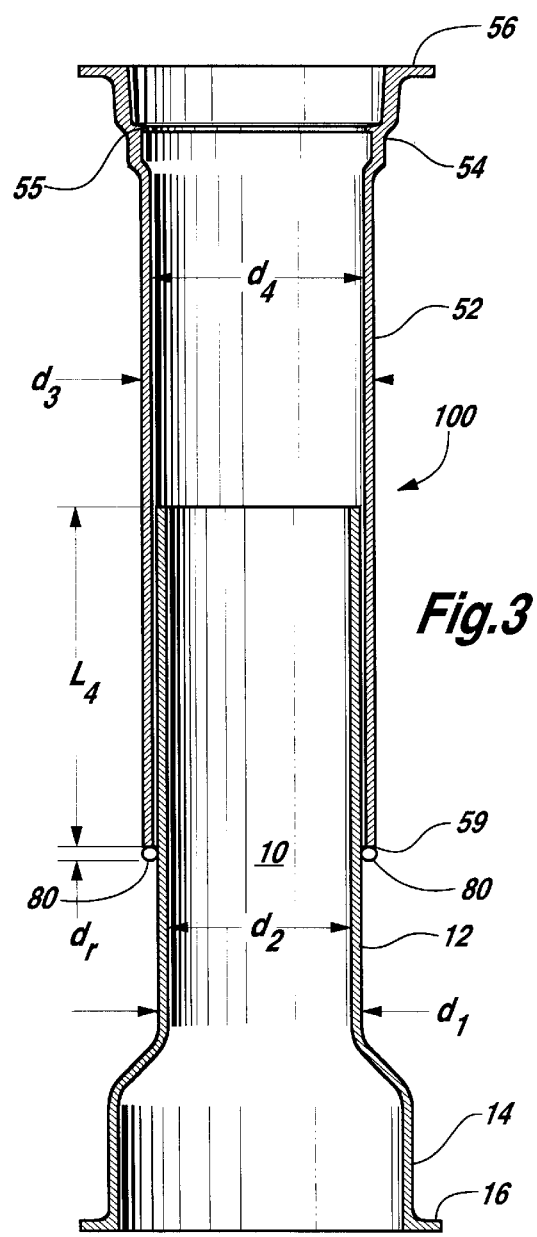
FIG. 3 is a cross section of the adjustable valve box of the present invention taken at section 3—3 of FIG. 1.
Figure 2:
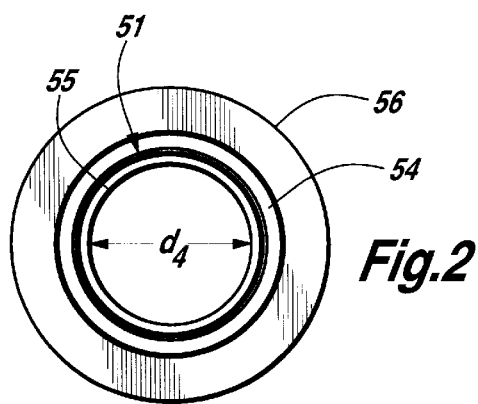
FIG. 2 is an upper end view of the adjustable valve box of FIG. 1.
Figure 4:
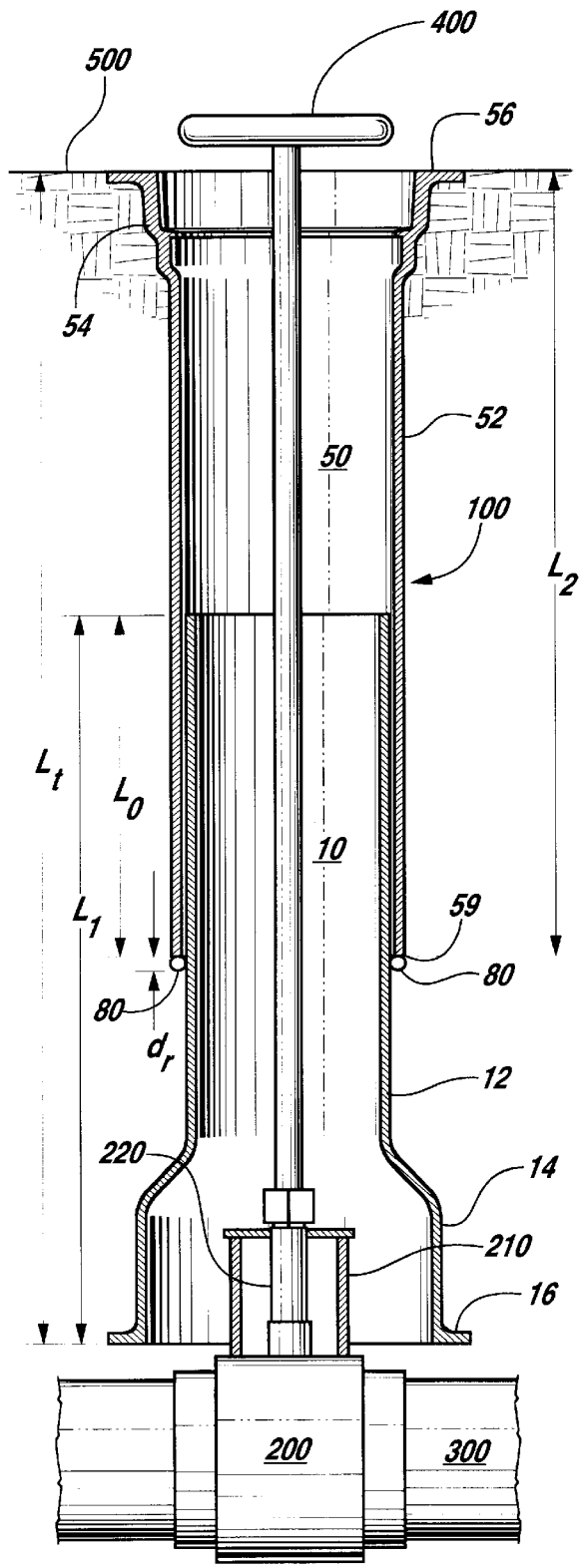
FIG. 4 is a cross section view of the adjustable valve box of the present invention illustrating a lower bell installed over an underground valve and with a valve key positioned for operation of the underground valve.
Figure 5:
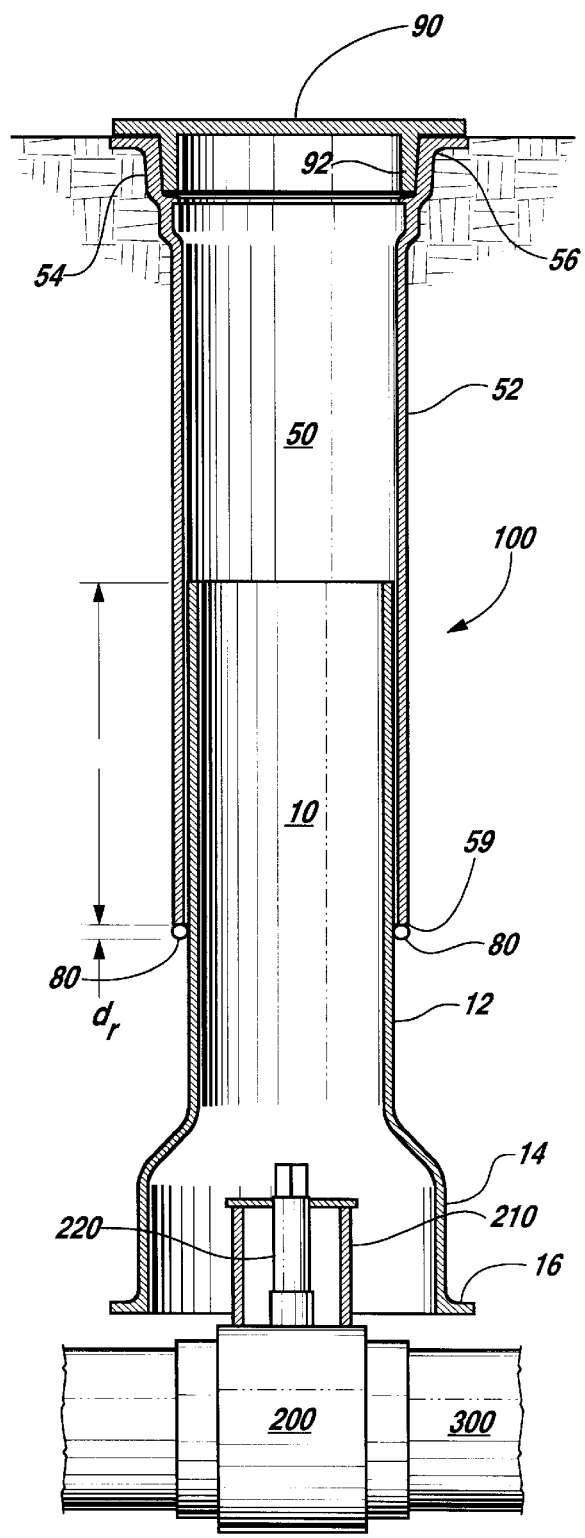
FIG. 5 is a cross section view of the adjustable valve box of the present invention illustrating the valve box having a top cover positioned in an upper bell.

Turning now to FIGS. 3, 4 and 5, the bell 14 of the first member 10 is sized to receive a bonnet 210 and a valve stem 220 of an underground valve 200, positioned in an underground pipeline 300. The underside of peripheral flange 16 provides a bearing surface resisting penetration of the first member 10 of valve box 100 into the surrounding soil and/or penetrating the valve 200 and pipeline 300. In the preferred embodiment, tubular section 12 has an external diameter $d_1$ of 5.75 inches and an internal diameter $d_2$ of 5.25, with a wall thickness of 0.25 inches.

Turning now to FIGS. 1 and 3, the bell 54 of second member 50 includes a conical cavity 51 narrowing in internal and external diameter from the peripheral flange 56 to the tubular section 52. Disposed in the conical cavity 51 is a circumferential ledge 55. The ledge 55 receives mating extended ring 92 of valve box cover 90, thereby supporting valve box cover 90 (FIG. 5). In the preferred embodiment, tubular section 52 has an external diameter $d_3$ of 6.625 inches and an internal diameter $d_4$ of 6.125 inch with a wall thickness of 0.25 inches.

The relationship between the external diameter $d_1$ of the first member 10 and the internal diameter $d_4$ of the second member 50 is an important element of the present invention. When the second element 50 is telescoped over the first element 10, the gap between the exterior surface of the tubular section 12 of the first element 10 and the interior surface of the tubular section 52 of the second element 50 must be sufficient to allow the elements to slide past one another freely to the desired overlap distance $L_o$, but also maintain a close tolerance sufficient that the central vertical axis of the first and second members remains substantially in alignment. Additionally, the peripheral edge 59 of the tubular section 52 must rest on O-ring 80, and not ride over the O-ring 80, in order that the first member 10 is prevented from telescoping past the desired overlap distance $L_o$.

When valve box 100 is installed, the underside of the peripheral flange 56 of the second member 50 provides a bearing surface assisting the O-ring 80 in preventing further telescoping of the second member 50 over the first member 10.

Turning now to FIGS. 4 and 5 therein is illustrated valve box 100 assembled and in service. The first step in assembly of the valve box 100 is determining the position of the lower peripheral flange 16 relative to the valve 200 and the position of the upper peripheral flange 56 relative to the surface grade 500. Next, the overall desired vertical length $L_t$ of the valve box 100 is calculated based on the positioning of the upper flange 56 and lower flange 16. Then the overlap distance $L_o$ is calculated by subtracting either the total axial length of the first member $L_1$ from $L_t$, or the total axial length of the second member $L_2$ from $L_t$.

The O-ring gasket 80 is then positioned around the exterior surface of the tubular portion 12 of the first member 10 the distance $L_o$ from the top end 13 of the tubular section 12. The second member 50 is telescoped over the first member 10 and positioned with the lower end 59 of the tubular section 52 in contact with the O-ring 80. Experimental tests have demonstrated the O-ring 80 will resist in excess of 200 pounds of imposed vertical axial load, above the weight of member 50. As previously mentioned, the tensile strength of O-ring 80 is an important element of the present invention as the O-ring 80 must prevent the second member 50 from telescoping over member 10 past the desired overlap distance $L_o$ until soil is filled in around the valve box 100. When soil is filled in around the valve box 100, additional vertical support is provided by the bearing surface of the peripheral flange 56 and the inherent surface friction between the surrounding soil and the exterior surface of the member 50.

FIGS. 4 and 5 illustrate a typical installation of valve box 100. FIG. 4 illustrates access to valve stem 220 of valve 200 by a key 400. FIG. 5 illustrates valve cover 90 positioned in bell 54 with support ring 92 contacting the interior ledge 55 of the bell 54.

Figure 6:
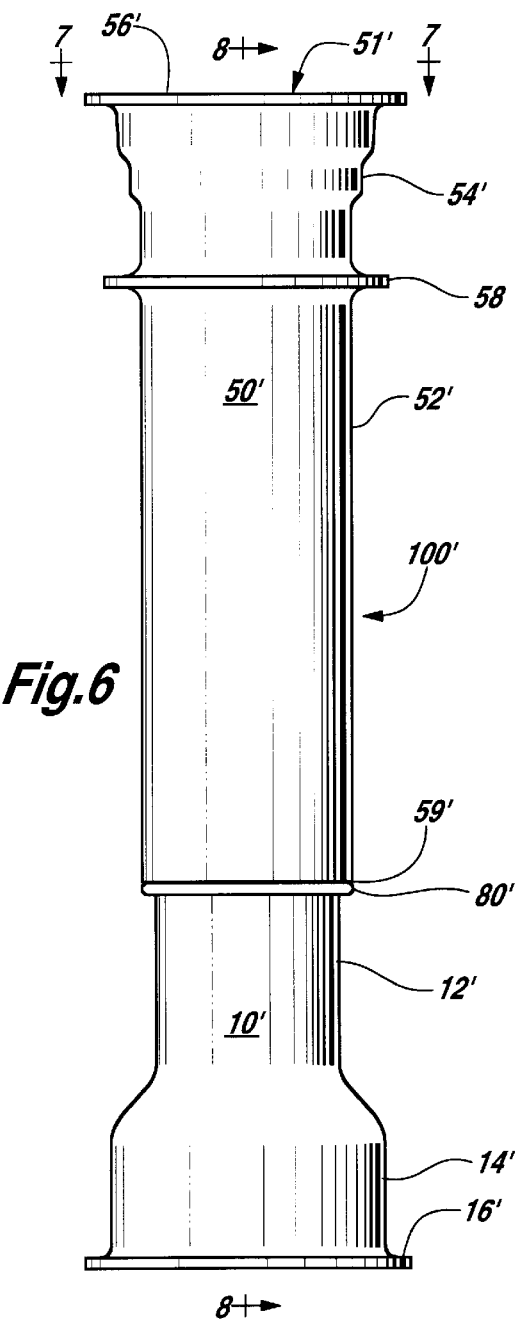
FIG. 6 is a side view of a second embodiment of the adjustable valve box of the present invention.
Figure 8:
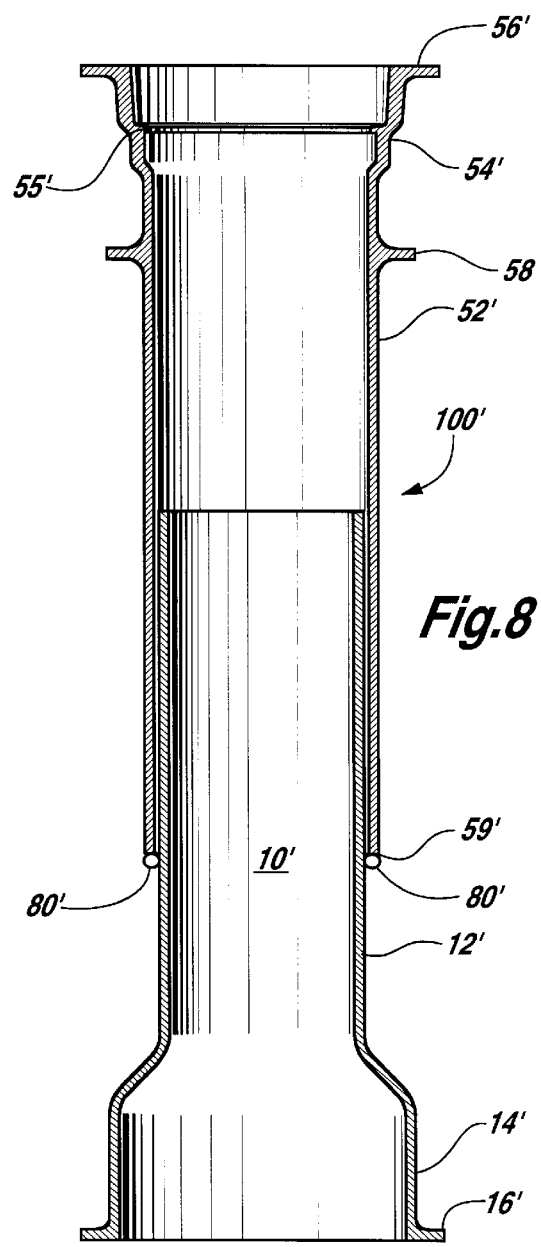
FIG. 8 is a cross section of the adjustable valve box of the present invention taken at section 8—8 of FIG. 6.
Figure 7:
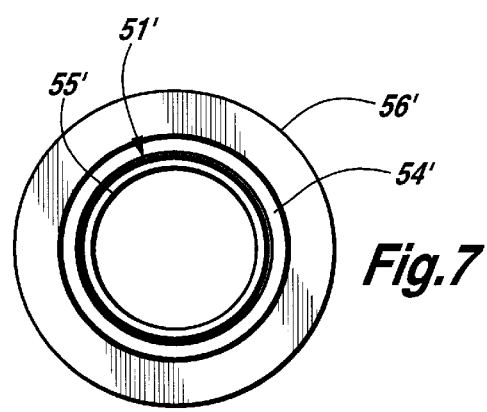
FIG. 7 is an upper end view of the adjustable valve box of FIG. 6.

Referring now to FIGS. 6 and 7 therein is illustrated a second embodiment of the present invention. Parts assigned reference numerals designated by (') have similar structure and function as parts heretofore described and assigned like reference numerals without the (') designation. The adjustable valve box 100' is manufactured from cast ductile iron and comprises a first member 10' having a tubular section 12' with a bell 14' and a peripheral flange 16' disposed at a distal end. The central longitudinal axis of the first member is oriented vertically. The invention further includes a second member 50' with a tubular section 52' with a bell 54' and a flange 56' disposed at a distal end. A second peripheral flange 58 is disposed on the exterior surface of the second member 50' approximately six inches below the face of the flange 56'.

The tubular section 52' of the second member 50' is telescoped over the tubular section 12' of the first member 10', wherein the respective bells 54' and 14' and flanges 56' and 16' are disposed on opposite ends of the valve box 100 and with the central longitudinal axis of each positioned vertically and substantially in alignment.

The valve box 100' further includes an O-ring gasket 80' positioned circumferentially around the exterior of the tubular section 12' of the first member 10'. The lower end 59' of the tubular section 52' of the second member 50' contacts the O-ring gasket 80'.

The bell 54' of second member 50' includes a conical cavity 51' narrowing in internal and external diameter from the peripheral flange 56' to the tubular section 52'. Disposed in the conical cavity 51' is a circumferential ledge 55'. The ledge 55' receives a valve box cover (not shown).

When valve box 100' is installed, the underside of peripheral flange 16' provides a bearing surface resisting penetration of the first member 10' of valve box 100' into the surrounding soil. The underside of the peripheral flange 56' of the second member 50' provides a bearing surface assisting the O-ring 80' in preventing further telescoping of the second member 50' over the first member 10. The underside of the second peripheral flange 58 provides additional bearing surface for resisting penetration of the second member into the surrounding soil and thereby provides additional stability to the valve box of the present invention.

Although preferred and alternate embodiments of the adjustable valve box of the present invention have been illustrated in the accompanying Drawings and described in the foregoing Detailed Description, it will be understood that the invention is not limited to the embodiments disclosed, but may be modified without departing from the spirit of the invention as set forth and defined by the following claims.

I claim:

1. An adjustable valve box comprising:
a first member having a central longitudinal axis, said member including:
   a tubular section having an inside, an outside, a lower end, an upper end, and a predetermined external diameter,
   a bell connected to the lower end of the tubular section,
a second member having a central longitudinal axis, said member including:
   a tubular section having an inside, an outside, a lower end and an upper end, said tubular section including a predetermined interior diameter sized for slidably receiving the upper end of the tubular section of the first member, a bell connected to the upper end of the tubular section, said tubular section of the second member being telescoped over the tubular section of the first member, the inside of the tubular section of the first member being slidably in contact with the outside of the tubular section of the second member, wherein the respective bells are disposed on opposite ends of the valve box, and the central longitudinal axis of each being substantially in alignment; and an O-ring gasket positioned around the outside of the tubular section of the first tubular member and contacting the lower end of the tubular section of the second member.

2. The valve box of claim 1 wherein the O-ring positioned around the first tubular member supports the second tubular member and prevents the second member from movement in an axial direction past a predetermined point.

3. The valve box of claim 1 further including a valve box cover received in the bell of the second member.

4. The valve box of claim 1 further including a peripheral flange disposed circumf erentially on the outside of the tubular section of the second member between the upper end and the lower end.

5. An adjustable valve box comprising:

a first member having a central longitudinal axis, said member including:
   a tubular section having an inside, an outside, a lower end, an upper end, and a predetermined external diameter,
   a peripheral flange connected to the lower end of the tubular section, a second member having a central longitudinal axis, said member including:
   a tubular section having an inside, an outside, a lower end and an upper end, said tubular section including a predetermined interior diameter sized for slidably receiving the upper end of the tubular section of the first member,
   a peripheral flange connected to the upper end of the tubular section,
   said tubular section of the second member being telescoped over the tubular section of the first member, the inside of the tubular section of the first member being slidably in contact with the outside of the tubular section of the second member, wherein the respective flanges are disposed on opposite ends of the valve box, and the central longitudinal axis of each being substantially in alignment; and an O-ring gasket positioned around the outside of the tubular section of the first tubular member and contacting the lower end of the tubular section of the second member.

6. The valve box of claim 5 wherein the O-ring positioned around the first tubular member supports the second tubular member and prevents the second member from movement in an axial direction past a predetermined point.

7. The valve box of claim 5 further including a valve box cover received in the bell of the second member.

8. The valve box of claim 5 further including a second peripheral flange disposed circumferentially on the outside of the tubular section of the second member between the upper end and the lower end.

9. An adjustable valve box comprising:

a first member having a central longitudinal axis, said member including:
   a tubular section having an inside, an outside, a lower end, an upper end, and a predetermined external diameter,
   a bell connected to the lower end of the tubular section, and
   a peripheral flange connected to the bell, a second member having a central longitudinal axis, said member including:
   a tubular section having an inside, an outside, a lower end and an upper end, said tubular section including a predetermined interior diameter sized for slidably receiving the upper end of the tubular section of the first member,
   a bell connected to the upper end of the tubular section,
   a first peripheral flange connected to the bell,
   a second peripheral flange disposed circumferentially on the outside of the tubular section of the second member between the upper end and the lower end,
   said tubular section of the second member being telescoped over the tubular section of the first member, the inside of the tubular section of the first member being slidably in contact with the outside of the tubular section of the second member, wherein the respective bells and flanges are disposed on opposite ends of the valve box, and the central longitudinal axis of each being substantially in alignment; and an O-ring gasket positioned around the outside of the tubular section of the first tubular member and contacting the lower end of the tubular section of the second member.

10. The valve box of claim 9 wherein the O-ring positioned around the first tubular member supports the second tubular member and prevents the second member from movement in an axial direction past a predetermined point.

11. The valve box of claim 9 further including a valve box cover received in the bell of the second member.

* * * * *